S. E. BROWN.
ATTACHMENT FOR LISTERS.
APPLICATION FILED JUNE 4, 1907.
920,016.
Patented Apr. 27, 1909.
2 SHEETS—SHEET 1.
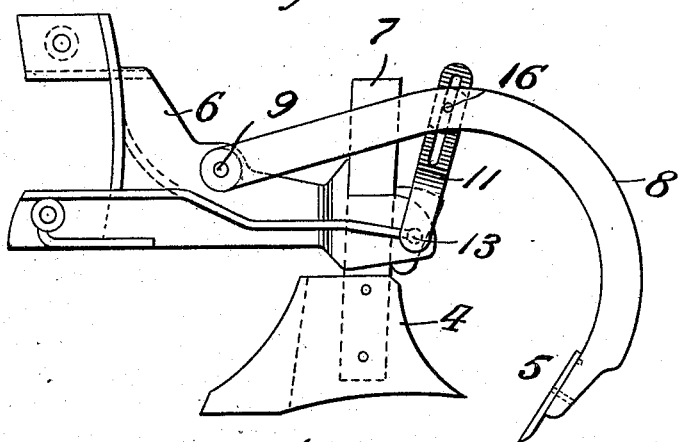
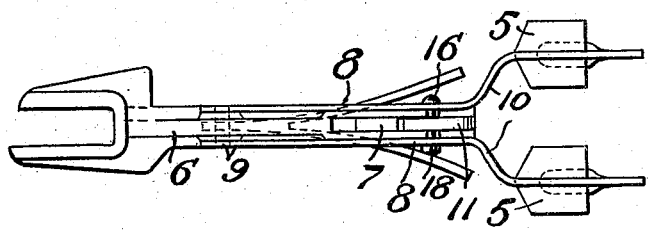
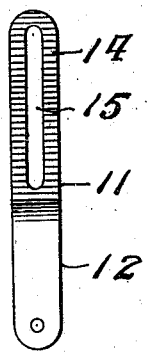 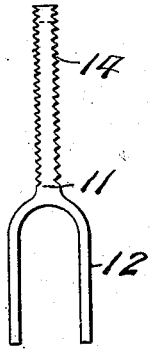   
Witnesses
Hugh H. Ott
J. F. Byrne
Inventor
Sidney E. Brown.
By Victor J. Evans
Attorney

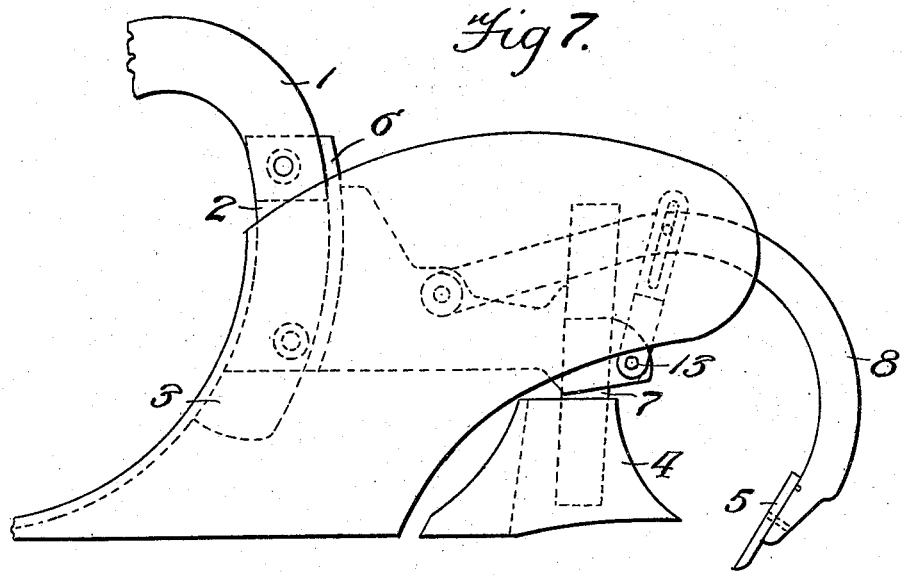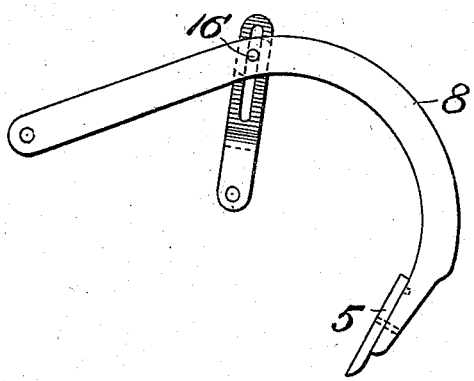

UNITED STATES PATENT OFFICE.

SIDNEY E. BROWN, OF MARSHALL, MISSOURI.

ATTACHMENT FOR LISTERS.

No. 920,016.     Specification of Letters Patent.     Patented April 27, 1909.

Application filed June 4, 1907. Serial No. 377,259.

*To all whom it may concern:*

Be it known that I, SIDNEY E. BROWN, a citizen of the United States, residing at Marshall, in the county of Saline and State of Missouri, have invented a new and useful Attachment for Listers, for which I desire to secure a patent.

My invention relates to lister plows, and its primary object is to provide means adapted to support the shovels at different elevations to regulate depth of their penetration of the soil.

A further object of my invention is to provide a shovel supporting means which can be secured to any construction of lister plow, which is simple, durable and efficient, and which can be manufactured and sold at a comparatively low cost.

With the above and other objects in view, the invention consists in the construction, combination and arrangement of parts hereinafter fully described, claimed and illustrated in the accompanying drawings, wherein:

Figure 1 is a view in side elevation, illustrating the application of my improved shovel support. Fig. 2 is a top plan view. Fig. 3 is a detail view in side elevation of the support. Fig. 4 is a detail view in end elevation thereof. Fig. 5 is a detail view in front elevation of the serrated plate. Fig. 6 is a view in side elevation thereof. Fig. 7 is a view in side elevation of a lister plow equipped with a shovel support constructed in accordance with my invention, and Fig. 8 is a view in side elevation illustrating the manner in which the support is secured to the beam of the shovel.

Referring to the drawings by reference numerals, 1 designates the beam, 2 the standard, 3 the plow proper, 4 the subsoil plow, and 5 the shovels of a lister plow of the usual form and construction. As is usual in this type of plow, the subsoil plow 4 and the shovels 5 are carried by a bracket 6 which is secured to and projects rearwardly from the plow beam 2 between the mold boards of the plow proper. The subsoil plow 4 is secured to the bracket 6 through the medium of a standard 7 and the shovels 5 are secured thereto through the medium of curved beams 8. The beams 8 are pivotally secured to the bracket 6 by means of a pin 9 and project rearwardly therefrom. The beams 8 are offset laterally, as at 10, to dispose the shovels 5 in proper relative spaced relation.

My improved support comprises a bar 11 which is pivotally mounted upon the bracket 6 preferably in rear of the subsoil plow standard 7. The lower end of the bar 11 is forked, as at 12, to straddle the bracket 6, and it is pivotally secured in applied position by means of a pin 13 which passes through the legs of the fork 12 and through the bracket 6, as fully disclosed in Fig. 1 of the drawings. The bar 11 is preferably rectangular in cross-section, and the opposite sides thereof are provided with ratchet teeth 14, said bar being provided with a longitudinally extending slot 15. The application of the bar 11 positions it between the shovel beams 8 which are connected therewith by means of a bolt 16 which passes through the beams 8 and through the slot 15, as fully disclosed in Fig. 2 of the drawings.

Mounted upon the bolt 16 between each of the beams 8 and each side of the bar 11 is a serrated plate 17, which are adapted to engage the teeth 14 of the bar 11 to retain the beams in their adjusted positions. The plates 17 are clamped in engagement with the bar 11 through the medium of a nut 18 upon the bolt 16, as will be readily understood. By loosening the nut 18, the beams 8 may be moved on their pivots to effect the adjustment of the shovels 5. As the bar 11 is pivotally mounted, the bolt 16 may move freely in the slot 15 during the adjustment of the shovels 5. After the shovels have been adjusted, the nut 18 is moved upon the bolt 16 to cause the plates 17 to firmly engage the serrated teeth 14 of the bar 11. The engagement between the plates 17 and the bar 11 is such as to rigidly support the shovels 5 in their adjusted positions.

From the foregoing description taken in connection with the accompanying drawings, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim is:

A lister plow including a bracket, shovel beams pivotally secured to the bracket, a bar provided with an elongated slot and with serrated sides, the lower end of the bar being forked to straddle the bracket, a pin passing through the legs of the fork and through the bracket to pivotally secure the bar to the bracket in rear of the pivot of the shovel beams, the free end of the bar being disposed between the beams, a bolt passing through the beams and through the slot in the bar, and serrated plates mounted upon the bolt between the bar and the beams, said plates engaging the serrated sides of the bar to support the beams in adjusted position.

SIDNEY E. BROWN.

Witnesses:
 A. C. BALDWIN,
 A. LEWIS.